United States Patent
Phirmis et al.

(10) Patent No.: US 10,091,178 B2
(45) Date of Patent: Oct. 2, 2018

(54) METHOD FOR SUPPLYING PROTECTED MULTIMEDIA CONTENT TO A TERMINAL

(71) Applicant: VIACCESS, Paris la Défense (FR)

(72) Inventors: Mathieu Phirmis, Antony (FR); Mathieu Boivin, Aulnay-sous-bois (FR); Quentin Chieze, Paris (FR); Nicolas Pochon, Paris (FR)

(73) Assignee: VIACCESS, Paris la Défense (FR)

( * ) Notice: Subject to any disclaimer, the term of this patent is extended or adjusted under 35 U.S.C. 154(b) by 125 days.

(21) Appl. No.: 15/122,764

(22) PCT Filed: Feb. 20, 2015

(86) PCT No.: PCT/FR2015/050424
§ 371 (c)(1),
(2) Date: Aug. 31, 2016

(87) PCT Pub. No.: WO2015/132500
PCT Pub. Date: Sep. 11, 2015

(65) Prior Publication Data
US 2017/0070496 A1    Mar. 9, 2017

(30) Foreign Application Priority Data
Mar. 2, 2014 (FR) ..................... 14 51666

(51) Int. Cl.
*H04L 29/06* (2006.01)
*G06F 1/14* (2006.01)
*G06F 21/10* (2013.01)

(52) U.S. Cl.
CPC ............... *H04L 63/08* (2013.01); *G06F 1/14* (2013.01); *G06F 21/10* (2013.01); *H04L 63/123* (2013.01);
(Continued)

(58) Field of Classification Search
CPC ..... G06F 21/10; G06F 1/14; H04L 2209/603; H04L 2463/101
See application file for complete search history.

(56) References Cited

U.S. PATENT DOCUMENTS

| | | | |
|---|---|---|---|
| 6,889,212 B1* | 5/2005 | Wang | G06Q 30/018 370/259 |
| 8,448,009 B2* | 5/2013 | Yairi | G06F 1/14 713/502 |

(Continued)

FOREIGN PATENT DOCUMENTS

| | | |
|---|---|---|
| EP | 1 376 304 | 1/2004 |
| EP | 1 806 672 | 7/2007 |

(Continued)

*Primary Examiner* — James R Turchen
(74) *Attorney, Agent, or Firm* — Occhiuti & Rohlicek LLP

(57) ABSTRACT

A Method for supplying protected multimedia content during which a terminal a) acquires a service date from a date server and b) evaluates a temporal criterion of a licence with respect to the last acquired service date. A headend associates with each segment of the multimedia content, its transmission date, and transmits it in a stream together with the segment. The terminal extracts from the stream the date of transmission of the segment, then it compares the extracted transmission date to the last acquired service date. And, only if the extracted transmission date is later than the last acquired service date, acquires it as service date, and uses it as last acquired service date on an execution of the step b) between two successive executions of the step a).

11 Claims, 2 Drawing Sheets

(52) U.S. Cl.
CPC .. *H04L 2209/603* (2013.01); *H04L 2463/101* (2013.01)

(56) References Cited

U.S. PATENT DOCUMENTS

| | | | | |
|---|---|---|---|---|
| 8,688,588 | B2* | 4/2014 | Holtzman | G06F 21/10 705/59 |
| 9,213,360 | B2* | 12/2015 | Ishii | G06F 1/14 |
| 9,686,234 | B1* | 6/2017 | Dorwin | H04L 63/00 |
| 9,697,363 | B1* | 7/2017 | Dorwin | G06F 21/60 |
| 2003/0078795 | A1* | 4/2003 | Collier | G06F 21/10 705/59 |
| 2003/0233553 | A1 | 12/2003 | Parks et al. | |
| 2005/0251603 | A1* | 11/2005 | Ishii | G06F 1/14 710/110 |
| 2006/0248596 | A1 | 11/2006 | Jain et al. | |
| 2007/0008969 | A1* | 1/2007 | Elstermann | H04L 29/06027 370/390 |
| 2007/0197197 | A1* | 8/2007 | Minear | G06F 21/10 455/414.1 |
| 2008/0010207 | A1* | 1/2008 | Yanagihara | H04L 9/0836 705/51 |
| 2009/0006854 | A1 | 1/2009 | Alkove et al. | |
| 2009/0119217 | A1* | 5/2009 | Ham | G06F 21/10 705/59 |
| 2009/0328228 | A1* | 12/2009 | Schnell | G06F 21/10 726/26 |
| 2010/0024000 | A1* | 1/2010 | Holtzman | G06F 21/10 726/2 |
| 2012/0185695 | A1* | 7/2012 | Shah | H04L 9/0822 713/172 |
| 2013/0121489 | A1* | 5/2013 | Pestoni | H04L 9/0822 380/210 |
| 2014/0033323 | A1 | 1/2014 | Moroney et al. | |
| 2014/0237625 | A1* | 8/2014 | Zatsepin | G06F 21/105 726/28 |

FOREIGN PATENT DOCUMENTS

| | | |
|---|---|---|
| EP | 1 843 273 | 10/2007 |
| WO | WO2007/002451 | 1/2007 |

\* cited by examiner

METHOD FOR SUPPLYING PROTECTED MULTIMEDIA CONTENT TO A TERMINAL

RELATED APPLICATIONS

This application is a U.S. National Stage of international application number PCT/FR2015/050424 filed Feb. 20, 2015, which claims the benefit of the priority date of French Patent Application FR 1451666, filed Mar. 2, 2014, the contents of which are herein incorporated by reference.

FIELD OF INVENTION

The invention relates to a method for supplying, to a terminal, multimedia content protected by a multimedia content protection system. The invention relates also to a method for obtaining, by a terminal, protected multimedia content for the implementation of this method for supplying multimedia content. The invention relates finally to a terminal and an information storage medium for implementing this method for obtaining multimedia content. The methods concerned can be implemented as part of any service for supplying protected multimedia content, in any system for the online supply of protected multimedia content, in which a headend ensures the protection of the contents and its transmission to a plurality of terminals.

BACKGROUND

A terminal is used by a client of the service to access a content in order to play it. Accessing a multimedia content here means loading it into memory and lifting or removing its protection, on the fly while it is being received, or on a storage medium on which it has previously been stored, storing it, or making any other use thereof offered by the service for supplying protected multimedia content.

The contents supplied are:
audiovisual contents, for example television programmes,
audio-only contents, for example a radio programme, or
more generally, any digital content containing video and/or audio such as a computer application, a game, a slide show, an image or any set of data.

Among these contents, attention will be focused more particularly hereinbelow on the so-called temporal contents. A temporal multimedia content is a multimedia content, the playing of which is a succession in time of sounds, in the case of an audio temporal content, or of images, in the case of a video temporal content, or of sounds and of images temporally synchronized with one another in the case of an audiovisual temporal multimedia content. A temporal multimedia content can also include interactive temporal components temporally synchronized with the sounds or the images.

To be supplied, such a content is first of all encoded, that is to say compressed, so that its transmission requires a lesser bandwidth.

To this end, the video component of the content is encoded according to a video format, such as, for example, MPEG-2. The interested reader will be able to find a complete presentation of this format in the document published by the International Organization for Standardization under the reference ISO/IEG 13818-2:2013 and the title "Information technology Generic coding of moving pictures and associated audio information—Part 2: Video". Numerous other formats, such as MPEG-4 ASP, MPEG-4 Part 2, MPEG-4 AVC (or Part 10), HEVC (High Efficiency Video Coding), or WMV (Windows Media Video) can alternatively be used, and rely on the same principles. Thus, all of the below applies also to these other video formats which rely on the same principle as the MPEG-2 coding.

The MPEG-2 coding involves general data compression methods. For the fixed images, it notably exploits the spatial redundancy internal to an image, the correlation between the neighbouring points and the lesser sensitivity of the eye to the details. For the moving images, it exploits the strong temporal redundancy between successive images. The exploitation thereof makes it possible to code certain images of the content, here said to be deduced, with reference to others, here called source images, for example by prediction or interpolation, such that their decoding is possible only after that of said source images. Other images, here called initial images, are coded without reference to such source images, that is to say that they each contain, when they are coded, all the information necessary to their decoding and therefore that they can be completely decoded independently of the other images. The initial images are thus the obligatory point of entry upon accessing the content. The resulting coded content does not therefore include the data necessary to the decoding of each of the images independently of the others, but is made up of "sequences" according to the MPEG-2 terminology. A sequence produces the compression of at least one "group of images" (for GOP, standing for Group Of Pictures, in MPEG-2). A group of images is a series of consecutive images in which each image is:

either initial and source for at least one deduced image contained in the same series of consecutive images,
or deduced and such that each of the source images necessary for its decoding belongs to the same series of consecutive images.

A group of images does not contain a series of consecutive images that is smaller and that has the same properties as above. The group of images is thus the smallest part of content that can be accessed without having to first decode another part of this content.

A sequence is delimited by a "header" and an "end", each identified by a first specific code. The header comprises parameters which characterize properties expected of the decoded images, such as the horizontal and vertical sizes, ratio, frequency. The standard recommends repeating the header between the groups of images of the sequence, so that its successive occurrences are spaced apart by approximately a few seconds in the coded content.

For example, a group of images most commonly comprises more than 5 to 10 images and, generally, fewer than 12 or 20 or 50 images. For example in a system with 25 images per second, a group of images typically represents a playing time greater than 0.1 or 0.4 seconds and, generally, less than 0.5 or 1 or 10 seconds.

A temporal multimedia content can comprise a plurality of video components. In this case, each of these components is coded as described above.

The audio component of the content is moreover coded according to an audio format such as MPEG-2 Audio. The interested reader will be able to find a complete presentation of this format in the document published by the International Organization for Standardization under the reference ISO/IEC 13818-3:1998 and the title: "Information technology—Generic coding of moving pictures and associated audio information—Part 3: Sound", Numerous other formats, such as MPEG-1 Layer III, better known as MP3, AAC (Advanced Audio Coding), Vorbis or WMA (Windows Media Audio), can alternatively be used, and rely on the same principles. Thus, all of the below applies equally to these other audio formats which rely on the same principles as the MPEG-2 Audio coding.

The MPEG-2 Audio coding obeys the same principles described above for that of a video temporal content. The resulting coded content is therefore, similarly, made up of "frames". A frame is the audio analogue of a group of images in video. The frame is therefore notably the smallest part of audio content that can be accessed without having to decode another part of this audio content. The frame also contains all the information useful for its decoding.

A frame typically comprises more than 100 or 200 samples each coding a sound and, generally, fewer than 2000 or 5000 samples. Typically, when it is played by a multimedia appliance, a frame lasts longer than 10 ms or 20 ms and, generally, less than 80 ms or 100 ms. For example, a frame comprises 384 or 1152 samples each coding a sound. Depending on the signal sampling frequency, this frame represents a playing time of 8 to 12, or 24 to 36 milliseconds.

A temporal multimedia content can comprise a plurality of audio components. In this case, each of these components is coded as described above.

The coded components of the content, also qualified as basic bitstreams, are then multiplexed, that is to say, in particular, temporally synchronized, then combined into a single bitstream, or datastream.

Such a content, notably when it is the object of rights such as copyright or similar rights, is supplied protected by a multimedia content protection system. This system makes it possible to ensure that the conditions for accessing the content which evolve from these rights are observed.

It is then typically supplied encrypted as part of its protection by a Digital Rights Management system, or DRM. This encryption is generally performed by means of an encryption key, by a symmetrical algorithm. It is applied to the stream resulting from the multiplexing or before multiplexing, to the components of the coded content.

A DRM system is in fact a multimedia content protection system. The terminology of the field of digital rights management systems is thus used hereinbelow in this document. The interested reader will, for example, be able to find a more comprehensive presentation thereof in the following documents:

concerning the general architecture of a DRM system: DRM Architecture, Draft version 2.0, OMA-DRM-ARCH-V2_0-20040518-D, Open Mobile Alliance, 18 May 2004, more particularly concerning the licences: DRM Specification, Draft version 2.1 OMA-TS-DRM-DRM-V2_1-20060523-D, Open Mobile Alliance, 23 May 2006.

In such a digital rights management system, the obtaining of a licence enables a terminal to access the protected multimedia content.

Of well-known structure, such a licence comprises at least one right of access necessary for this terminal to access the content, and typically a temporal validity criterion. The right of access typically comprises a key, called content key, necessary for decrypting the multimedia content protected by a symmetrical decryption algorithm. The temporal validity criterion characterizes the period of time over which the licence can be used. It typically consists of one or more time intervals. Outside of these time intervals, the licence does not allow the access to the content.

The content key is generally inserted into the licence in the form of a cryptogram obtained by encryption of the content key with an encryption key, called "terminal key", specific to the terminal.

To access the content, the terminal extracts the content key from the licence, by decrypting its cryptogram using its terminal key.

The terminal then descrambles the content by means of the content key duly extracted from the licence, thus lifting the protection. Then, the terminal decodes the descrambled content.

The terminal thus generates a free-to-air or free access multimedia stream comprising at least one temporal series of video sequences or of groups of images, or of audio frames. This multimedia stream is suitable for being played by a multimedia appliance connected to this terminal. Here, "free-to-air" describes the fact that the multimedia stream does not need to be descrambled to be played, by a multimedia appliance, in a manner that is directly perceptible and intelligible to a human being. "Multimedia appliance" further describes any device suitable for playing the free-to-air multimedia stream, such as, for example, a television or a multimedia player.

In order to improve the protection thereof, the content is supplied, by the system supplying protected multimedia content, split into a plurality of successive content segments that are individually protected by the digital rights management system. These segments are therefore ordered temporally relative to one another.

More specifically, a segment is a restricted part of the free-to-air multimedia stream whose playing time is shorter than that of the entire multimedia stream. A segment therefore comprises a restricted part of each video and audio component of the free-to-air multimedia stream, whose playing time is shorter than that of the entire multimedia stream. These restricted component parts are synchronized in the stream to be played simultaneously. A segment therefore comprises the restricted part of the temporal series of video sequences or of groups of images, or of audio frames producing the coding of this restricted component part of the free-to-air multimedia stream. This restricted part is made up of a plurality of successive video sequences or groups of images or audio frames. Successive should be understood here to mean being immediately followed, that is to say without being separated, in the temporal unfolding of the content, by other video sequences or groups of images or audio frames belonging to another segment. Typically, a segment comprises more than 10, 100, 1000 or 10 000 groups of successive video images of one and the same coded video component of the stream, or more than 10 to 100 times more successive audio frames of one and the same coded audio component of the stream.

Each segment is encrypted by the symmetrical algorithm, as part of its protection by the digital rights management system, by means of a specific content key. This content key is said to be "specific" in that it is only used to encrypt this segment out of all the segments of the multimedia content. The obtaining of a specific licence, including the specific content key necessary for decrypting the protected segment, enables a terminal to access this segment.

A segment is not therefore characterized by its structure, but by the specific content key used to encrypt it. A segment is the plurality of immediately successive video sequences and audio frames encrypted with one and the same specific content key.

To further improve the protection of the content, an intermediate level of encryption of the content keys is introduced. It makes it possible to change, during the temporal unfolding of the content, the encryption keys used to compute the cryptograms of the specific content keys conveyed in the specific licences.

To this end, the segments are grouped together in blocks of segments. Each block contains only a restricted part of the segments of the content. Typically, each block contains at least one segment and, generally, a plurality of successive segments. Successive should be understood here to mean being immediately followed, that is to say without being separated, in the temporal unfolding of the content, by segments not belonging to the block concerned. A content key encryption key, called intermediate key, is associated with each of these blocks. The content key necessary for decrypting a segment, is encrypted with the intermediate key associated with the block to which this segment belongs. The resulting cryptogram is then inserted into a licence, called intermediate licence, transmitted together with the segment. The intermediate licence also comprises an identifier of a licence, called "terminal licence". The terminal licence comprises a cryptogram of the intermediate key obtained by the encryption of this intermediate key with the terminal key.

A block of segments is not therefore characterized by its structure, but by the intermediate key used to encrypt the specific content key of any segment that belongs to it. A block of segments therefore corresponds to the segments each associated with an intermediate licence in which the specific content key is encrypted with one and the same intermediate key.

In such a system, a terminal therefore receives, together with an encrypted segment, an intermediate licence comprising the cryptogram of the specific content key necessary for decrypting the segment. This cryptogram has been obtained by encrypting this specific content key with an intermediate key. In order to access the segment, the terminal must first obtain the terminal licence which comprises the cryptogram of this intermediate key obtained by encrypting this key with its terminal key. The terminal obtains this terminal licence by means of the content identifier in the intermediate licence.

To use this terminal licence, the terminal must then first evaluate its temporal criterion with respect to a service date, controlled by the service operator as temporal reference of the service. This evaluation consists in determining whether the service date, typically expressed in seconds, is or is not included in the validity period of the terminal licence. The terminal must therefore know or acquire the service date.

If the result of the evaluation of the temporal criterion of the terminal licence is positive, the terminal continues using the terminal licence, notably by decrypting the cryptogram of the intermediate key that it includes, by means of its terminal key. If the result of this evaluation is negative, the terminal disables the use of the terminal licence, and notably does not decrypt the cryptogram of the intermediate key that it includes. This thus prevents use of the intermediate licence, and the access to the protected segment using the content key for which it includes the cryptogram.

The service date acquired by the terminal thus conditions its access to the block of segments to which the received segment belongs, and therefore compliance with the rights to which this block is subject. It will be understood that it is important for the service date not to be able to be modified easily by a user of the terminal. In effect, he or she could then set it to a date included in the validity period of the terminal licence, thus being exempted from the service date controlled by the operator, and from the observance of the rights to which the corresponding segment is subject.

To remedy this drawback, it has already been proposed to equip the terminals with secured local clocks, that is to say clocks which cannot be set by the user of the terminal. Such solutions are, for example, disclosed in the applications US20090006854, US20060248596 and US2010024000A1.

Numerous terminals do not however have any secured clock, that is to say any internal mechanism suitable for locally supplying a date with a guarantee that is deemed sufficient for it to be sufficiently close to the service date. Most do not in fact have a local clock, and the others have only an unsecured clock, that is to say one that is unprotected and therefore remains modifiable by the user.

To remedy this last difficulty, it has been proposed to incorporate a date server in the DRM system. A local clock, internal to the terminal but not protected, is then regularly synchronized with this date server, for example according to the network time protocol, called NTP. If the terminal does not include any local clock or if it does not want to use this local clock, then the service date is acquired from the date server, systematically each time the temporal validity criterion of a licence has to be evaluated.

This last embodiment is advantageous because, since the recall to the date server therein is systematic, it dispenses with the use of a local clock, and dictates the use of a service date controlled by the operator. However, the result thereof is generally a demand, and therefore a computation load, that are significant for the date server, which requires a lot of servers to take the load. In effect, when numerous terminals require, in a short time interval, access to contents offered by the service supplying protected multimedia content, it is therefore necessary to evaluate the temporal validity criterion of the corresponding licences for each of the terminals used. The result thereof is a significant computation load for the date server. The result thereof is also significant network traffic to the date servers. Now these significant computation and network traffic loads are likely to impair the quality of the service provided.

It is therefore particularly advantageous to reduce this load and this network traffic, while guaranteeing a high level of security of the system with respect to attempts to manipulate the service date and without the need to use a local clock in the terminal.

SUMMARY OF INVENTION

The subject of the invention is thus a method for supplying to a terminal, protected multimedia content in accordance with Claim 1.

In such a method, the association, in the step a) with each of the segments, of its date of transmission and the transmission in the stream, in the step b), of this date together with the segment, enable the terminal to receive, in the step c), this date together with the segment, and therefore have it available, during the playing phase. The terminal is thus provided with a new source of dates, an alternative to the date server and different from a local clock, but controlled by the operator of the service for supplying protected multimedia content. It therefore supplies dates probably closer to the service date, and more difficult to modify than that of a local clock. These dates are therefore safer.

In such a method, the extraction from the stream, in the step g), together with a segment, of the date of transmission of the segment, enables the terminal to use, as service date, this date controlled by the operator of the service, when executing the step f), therefore without recourse to the date server. The load of the date server, as well as the associated network traffic, are thus reduced without compromising the level of security of the system.

The comparison, in the step g), of the extracted transmission date with the last acquired service date makes it possible to force this service date to increase and therefore restrict as far as possible the range of possible service dates between two requests to the date server.

Finally, the transmission, in the stream, of the transmission date generates less network traffic than the connection to a date server. In effect, for each date transmitted in the stream, there is no need to establish and then terminate a connection with a server. A connection is used here that is already established between the terminal and a headend.

Another subject of the invention is a method for obtaining, by a terminal, for the implementation of the above method, protected multimedia content, in accordance with Claim 2.

The embodiments of this method for obtaining protected multimedia content can comprise one or more of the features of the dependent claims.

These embodiments of this method for obtaining protected multimedia content also offer the following advantages:

the fact that, in the step g), the last acquired service date is kept unchanged if the extracted transmission date is prior to this service date by no more than a first predetermined duration makes it possible to allow deferred playing of a content during reception;

the comparison, in the step g), of the extracted transmission date with the service date acquired upon the last execution of the step e) makes it possible to force the terminal to acquire the service date from the date server, when it has not done for at least the second predetermined duration;

the disabling, in the step e), if the connection to the date server cannot be established, makes it possible to reinforce the constraint of acquiring the service date from the date server;

the counting of the number of consecutive times when the connection to the date server cannot be established makes it possible to protect the quality of service provided from the influence of momentary difficulties in connecting to the date server, by allowing the processing of the multimedia content to continue even in the absence of connection to the date server;

the acquisition, as service date, of any extracted transmission date later than the last acquired service date makes it possible to force the last acquired service date to increase in time with those of the received segments.

Another subject of the invention is an information storage medium comprising instructions for implementing the above method for obtaining multimedia content, when these instructions are executed by an electronic computer.

A final subject of the invention is a terminal for implementing the above method, this terminal being in accordance with Claim 10.

The invention will be better understood on reading the following description, given purely as a nonlimiting example, and given with reference to the drawings.

BRIEF DESCRIPTION OF THE DRAWINGS

In these figures, the same references are given to denote the same elements.

DETAILED DESCRIPTION

Hereinbelow in this description, the features that are well known to those skilled in the art are not described in detail.

Figure 1:
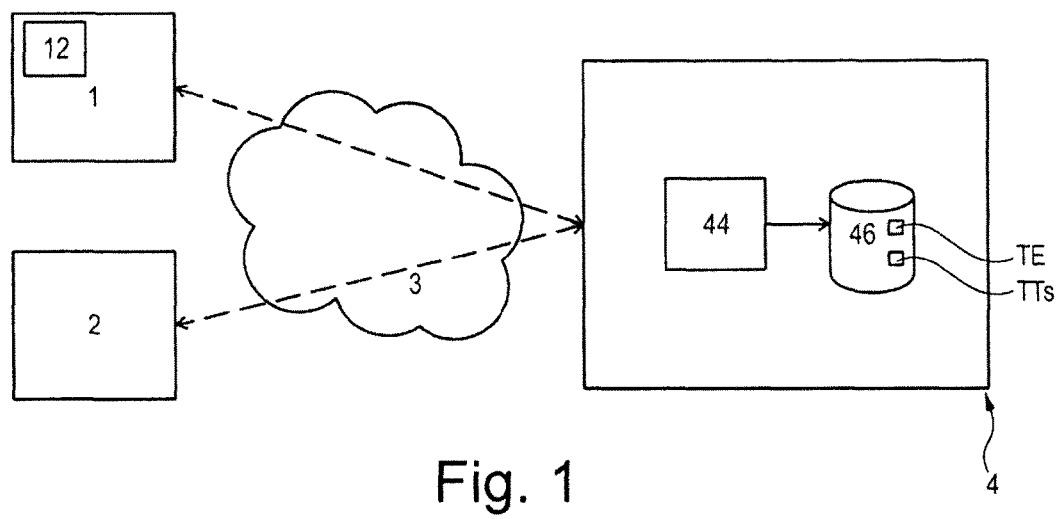
FIG. 1 is a schematic representation of the architecture of system for supplying protected multimedia content.

FIG. 1 represents a system for supplying protected multimedia content. This system comprises a plurality, typically thousands, of terminals linked, via a network 3, on the one hand to a headend 1, and on the other hand to a date server 2. Here, it is assumed that all these terminals are identical. Thus, to simplify the illustration, only one terminal 4 is represented in FIG. 1.

The terminal 4 is suitable for accessing a content in order to play it. To this end, the terminal 4 comprises a programmable electronic computer 44 and a memory 46. The computer 44 is suitable for executing instructions stored in the memory 46. The memory 46 comprises the instructions for the execution of the method of FIG. 5. The memory 46 also comprises the last acquired service date TE and a service date TTs acquired upon the last connection to the server 2.

The network 3 is a wide area network for distributing information that makes it possible to establish a two-way communication between the terminal 4 and the headend 1 and the server 2. For example, the network 3 is the worldwide web, better known as the "Internet network".

The headend 1 is suitable for protecting a content, and for transmitting it to the terminal 4. To this end, the head 1 comprises a clock 12. This clock 12 supplies, to the head 1, the date of transmission of a content segment. This clock 12 is here synchronized, according to the network time protocol NTP, with a first reference clock external to the head 1.

The date server 2 is suitable for supplying, to the terminal 4, a service date in response to a request. The server 2 is here synchronized, according to the NTP protocol, with a second reference clock external to the system.

The first and second reference clocks are, or are not, the same clock. By virtue of the hierarchical architecture, in levels called strata, associated with the NTP protocol, the first and second reference clocks are themselves, in the same way, each synchronized with a reference clock of the stratum immediately above, and so on, step by step and finally, each synchronized with a reference clock of the stratum 1. On each stratum, these reference clocks are, or are not, the same clock.

Here, for the head 1 and the server 2, only the differences with respect to a conventional headend and a conventional date server are described in detail. For information concerning a conventional headend and a conventional date server, the reader can refer to the prior art cited in the introduction to this patent application.

Figure 2:
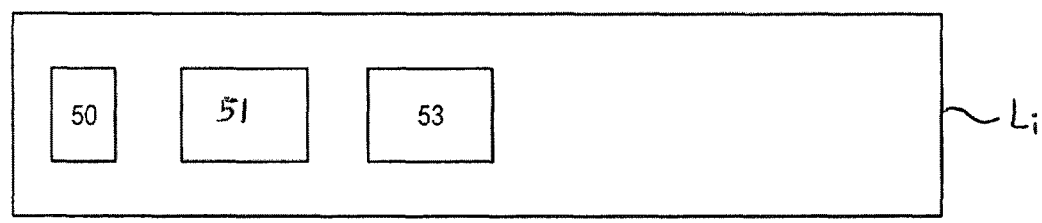
FIG. 2 is a schematic representation of an intermediate licence.

FIG. 2 represents an intermediate licence $L_i$. This licence $L_i$ notably comprises a cryptogram $(K_{si})*K_{Gp}$ 51 obtained by encrypting a key $K_{si}$ with an intermediate key $K_{Gp}$. The key $K_{si}$ is the key used to encrypt the segment $S_i$ of the multimedia content. The intermediate key $K_{Gp}$ is the key used to encrypt the keys $K_{si}$ of all the segments of the block $G_p$. The intermediate licence $L_i$ also comprises:

an identifier $Id(K_{Gp})$ 50 of this intermediate key $K_{Gp}$, and
a date $TS_i$ 53 of transmission of the segment $S_i$.

Figure 3:
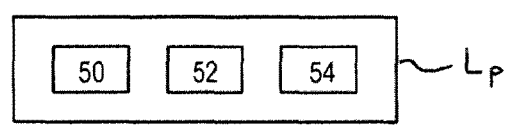
FIG. 3 is a schematic representation of a terminal licence.

The notations used in this figure and FIG. 3 are described in more detail with reference to FIG. 5.

FIG. 3 represents a licence $L_p$, or terminal licence, of a digital rights management system. This licence comprises a right 52 of access, and a temporal validity criterion 54 as defined in the introductory part of this patent application. The right 52 of access here comprises a cryptogram of this intermediate key $K_{Gp}$. The licence $L_p$ also comprises the intermediate key identifier $Id(K_{Gp})$ 50.

Figure 4:
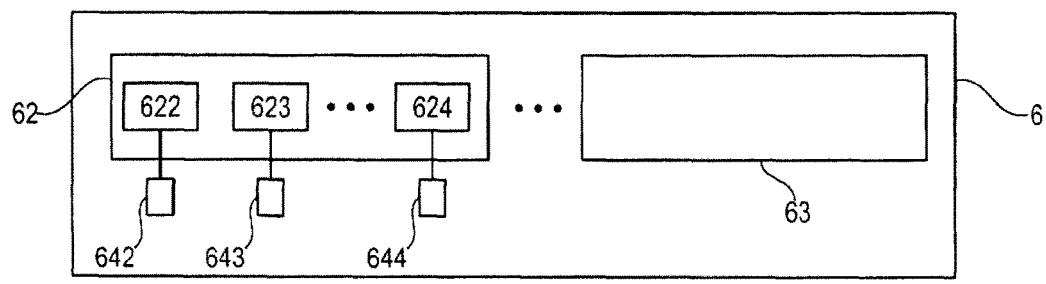
FIG. 4 is a schematic representation of a stream transmitted by a headend to a terminal in the system of FIG. 1.
Figure 5:
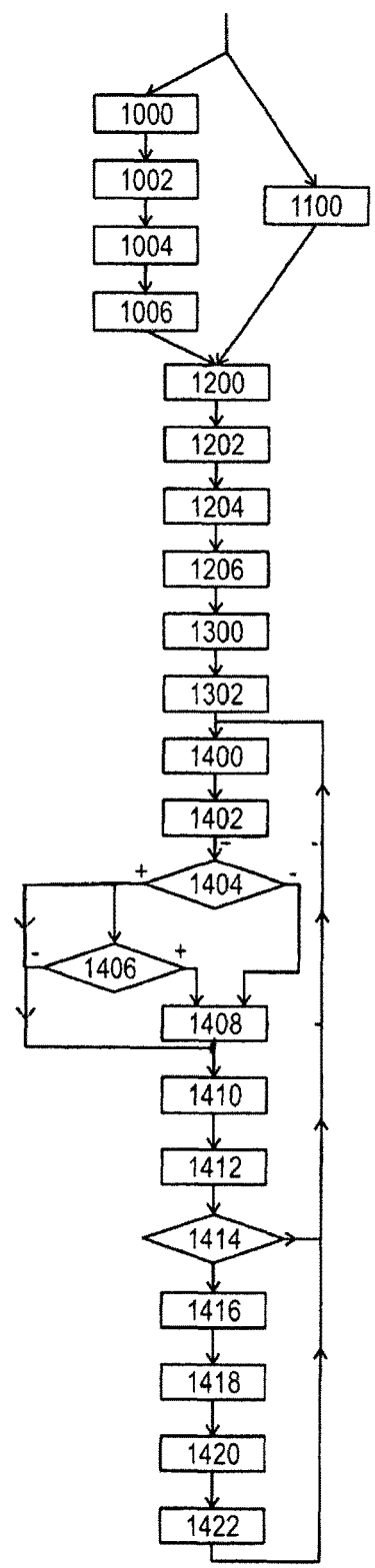
FIG. 5 is a schematic representation of a method for supplying protected multimedia content using the system of FIG. 1.

FIG. 4 represents a stream 6 transmitted by the headend 1 to the terminal 4 upon the implementation of the method of FIG. 5. The stream 6 comprises a plurality of blocks of multimedia content segments. For example, the stream 6 comprises more than 2, 10 or 100 blocks of segments. To simplify FIG. 3, only two blocks 62, 63 have been represented. In this figure, the symbol between the blocks 62, 63 indicates that blocks have not been represented. Here, it is assumed that all these blocks are structurally identical and differ from one another only by the content encoded in each of the segments. In particular, all the blocks comprise the same number of segments. Thus, only the structure of the block 62 will now be described in more detail.

The block 62 comprises a plurality of segments. Typically, the block 62 comprises more than 10 or 100 successive segments. The block 62 comprises only a restricted part of all the segments. The concatenation of all the blocks forms the content as a whole. Here, only three segments 622, 623 and 624 have been represented in FIG. 4. The symbol " . . . " between the segments 623 and 624 indicates that other segments have not been represented. Here, all these segments are structurally identical and differ from one another only by the information encoded in each of them. Thus, only the segment 622 is now described in more detail.

The segment 622 conforms to the definition of the term "segment" given in the introduction of this text. The segment 622 has associated with it an intermediate licence 642, transmitted together with this segment in the stream 6. Here this association is produced by synchronizing the segment 622 and the intermediate licence 642 in the stream. Typically, this synchronization is produced by the adjacency of the segment 622 and of the intermediate licence 642 in the stream, and, when the time comes, by their joint transmission. Similarly, intermediate licences 643 and 644 are associated with, respectively, segments 623 and 624.

The operation of the system of FIG. 1 will now be described with reference to the method of FIG. 5.

Initially, in a step 1000, as is known to those skilled in the art, the headend 1 obtains a free-to-air temporal multimedia content. It then encodes this content.

Then, in a step 1002, the head splits the encoded multimedia content into a plurality of successive content segments $S_i$. These segments $S_i$ are ordered temporally relative to one another, and their complete sequence constitutes the content. Hereinafter in this description, the index "i" is the serial number of the segment $S_i$ in this temporal series of segments.

The headend then ensures the individual protection, by a digital rights management system, of each of the segments $S_i$. In this respect, in a step 1004, it encrypts each segment $S_i$ with a specific content key $K_{si}$ which not used to encrypt another segment of the same sequence of segments.

Then, in a step 1006, the headend 1 constructs blocks $G_p$ of successive segments. The index "p" is the serial number of the block in the duly constructed series of successive blocks. Here, to this end, the headend 1 sets the number of segments contained in each block. For each block comprising this number of successive segments, it then generates an intermediate key $K_{Gp}$. The intermediate key $K_{Gp}$ is different for each block of the protected multimedia content. Then it encrypts the encryption key $K_{si}$ of each of the segments $S_i$ of the block $G_p$ with the intermediate key $K_{Gp}$. It therefore obtains, for each segment $S_i$ of the block $G_p$ the cryptogram $(k_{si})*k_{Gp}$ 51. The headend 1 then inserts the identifier $Id(K_{Gp})$ 50 of the intermediate key $K_{Gp}$ and the cryptogram $(K_{si})*K_{Gp}$ 51 into the intermediate licence $L_i$ that it associates with this segment $S_i$ as described with reference to FIG. 3.

In parallel, for example with one of the steps 1000, 1002, 1004 and 1006 in a step 1100, the headend 1 receives, from the terminal 4, a request for the purpose of obtaining the content. This request notably contains an identifier of a terminal key $K_T$. The key $K_T$ is here unique for each terminal. As is known to those skilled in the art, the key $K_T$ has been obtained by the terminal in its manufacturing or customization phase. The key $K_T$ has then been obtained by the headend 1 in a phase of registration of the terminal 4 before the implementation of the method of FIG. 5.

In response to the request received in the step 1100, the headend 1 implements the steps 1200, 1202, 1204 and 1206.

In the step 1200, the headend 1 encrypts each intermediate key $K_{Gp}$ used with the key $K_T$ of the terminal 4 to obtain the cryptogram $(K_{Gp})*K_T$. Then, for each block $G_p$, it inserts, as right 52 of access to this block, the cryptogram $(K_{Gp})*K_T$ into the licence $L_p$ of this terminal intended for the terminal 4. The identifier $Id(K_{Gp})$ 50 of the intermediate key $K_{Gp}$ is also inserted into the licence $L_p$ and into each intermediate licence $L_i$ associated with any segment $S_i$ of the block $G_p$. The licence $L_p$ is thus associated with each of the segments $S_i$, and therefore with the block $G_p$, by this identifier $Id(K_{Gp})$. Finally, the headend 1 inserts, into the licence $L_p$, the temporal validity criterion 54 of this licence. For example, this criterion 54 specifies that the licence $L_p$ can be used only between the 1 Jan. 2014 and the 1 Mar. 2014.

Then, in a step 1202, the headend 1 associates, with each of the segments $S_i$, its transmission date $TS_i$. Here, it obtains the date of transmission of the segment $S_i$ from the clock 12. Then, it inserts this transmission date $TS_i$ into the intermediate licence $L_i$ associated with the segment $S_i$. Typically, this date of transmission is that of the end of the computation of the intermediate licence $L_i$ associated with the segment $S_i$. It therefore precedes by very little, typically by a fraction of a second, the start of the transmission over the network 3 of this segment $S_i$. It is preferably inserted, integrity-protected, into the licence $L_i$.

The headend 1 thus generates, step by step, the stream 6 comprising each of the segments $S_i$ of the block $G_p$ concerned and its associated intermediate licence $L_i$ which itself comprises its transmission date $TS_i$.

The headend 1 finally transmits, to the terminal 4, in the step 1204, the licence $L_p$, and in the step 1206, the stream 6.

As is known to those skilled in the art, notably depending on the nature of service for supplying contents concerned and the request from the terminal, the steps 1204 and 1206 can be synchronized, or independent in time. For example, here, the service for supplying contents concerned is a content broadcasting service, and the request received in the step 1100, aims to obtain the content to play it on the fly as it is received. The step 1204 then precedes the step 1206 of broadcasting of the content, such that the licence $L_p$ is received and processed by the terminal before the block $G_p$ is played. The same applies if the request received in the step 1100 aims to obtain the content in order to make of it, on the fly as it is received, any other use controlled by the content protection system, such as its recording.

The terminal thus receives, in a step 1300, the licence $L_p$, and in a step 1302, the stream 6.

In a way that corresponds to that of the steps 1204 and 1206, the steps 1300 and 1302 can be synchronized, or independent in time. For example, here, the step 1300 precedes the step 1302, so that the licence $L_p$ is processed by the terminal before the block $G_p$ is played.

Then, the terminal undertakes a phase of playing the content. During this phase, it proceeds, in succession for each of the segments $S_i$ of the received stream 6, with the steps 1400 to 1422.

In the step 1400, the terminal extracts the segment $S_i$ and its associated intermediate licence $L_i$ from the stream 6.

Then, in the step 1402, the terminal extracts, from the licence $L_i$, the date $TS_i$ of transmission of the segment $S_i$.

Then, in the step 1404, the terminal compares the date of transmission $TS_i$ to the last acquired service date, here denoted TE.

If $TS_i$ is later than TE, then, in the step 1406, the terminal 4 replaces the value of the date TE with the value of the date $TS_i$ extracted in the step 1402. Then, still in the step 1406, the terminal 4 compares this new date TE to the last service date acquired from the date server 2, here denoted TTs.

If TE is later than TTs by at least a predetermined duration, here denoted ETTD, then the terminal proceeds with the step 1408 of acquiring the service date from the date server 2. Otherwise, the terminal proceeds directly to the step 1410. The terminal 4 is thus forced to regularly connect to the server 2.

The predetermined duration ETTD can have been initialized in the terminal 4 during the production of the system, or by the service operator. Its value is typically greater than 10 or 20 minutes. The value of the duration ETTD is also generally less than 10, 50 or 100 hours.

The values of the dates TE and TTs can initially have been acquired by the terminal 4, in a so-called installation, activation or customization phase for example, from the date server 2, or initialized, for example, at 0.

In the step 1404, if $TS_i$ is prior to TE by more than a predetermined duration, here denoted TSW, then the terminal proceeds directly to the step 1408 of acquiring the service date from the date server 2. Thus, when it has not been possible to rely on the date of transmission, it is essentially the service date communicated by the date server 2 which is used.

Finally, in the step 1404, if $TS_i$ lies between TE and TE-TSW, then the method continues directly with the step 1410. In this case, the date TE is not updated according to the date $TS_i$ extracted in the step 1402. This situation occurs when a segment is played by the terminal with a slight delay in relation to the moment of reception of this segment by this terminal. The value of the slight delay that is admissible is here equal to TSW.

The predetermined duration TSW can have been initialized in the terminal 4 during the production of the system, or by the service operator. Its value is typically greater than 10 or 20 minutes. Generally, its value is also less than an hour or 10 hours.

In the step 1408, the terminal 4 authenticates the server 2, for example using an electronic certificate. The terminal 4 also transmits, to the date server 2, a date request, and obtains a date in return. Only if the server 2 is successfully authenticated, the terminal 4 then acquires this date and replaces the value of the date $TT_s$ and of the date TE with the value of this date obtained from the server 2.

Here, in the step 1408, if the connection to the date server 2 cannot be established or if the authentication fails, the terminal 4 increments a connection failure counter. If the value of this counter does not cross a predetermined threshold, here denoted Max_tts_bypass, the terminal 4 proceeds to the step 1410 without modifying the values of the dates $TT_s$ and TE. If the value of this counter crosses the threshold Max_tts_bypass, the terminal 4 disables the step 1410 and subsequent steps of the method, notably the extraction of the right of access from the terminal licence $L_p$, thus preventing the access to the segment $S_i$. Then, the failure counter can be reinitialized to its initial value by the service operator. It can also be reinitialized automatically after a predetermined duration, for example greater than 30 min or 1 hour or 10 hours.

The threshold Max_tts_bypass can have been initialized in the terminal 4 during the production of the system, or by the service operator. Its value is typically greater than 2, 3 or 5 and, for example, less than 10, 20 or 50.

In the step 1410, the terminal 4 extracts, from the intermediate licence $L_i$, the identifier $Id(K_{Gp})$ 50 of the intermediate key $K_{Gp}$.

Then, in the step 1412, the terminal 4 searches, among the terminal licences received, for the licence L which includes the identifier $Id(K_{Gp})$ 50.

In the step 1414, the terminal 4 extracts the temporal criterion 54 from the licence $L_p$ found in the step 1412. Then, it evaluates this criterion with respect to the last acquired service date TE. If this service date satisfies the temporal criterion 54, then the terminal 4 implements the step 1416 and subsequent steps of the method. Otherwise, it disables the step 1416 and subsequent steps of the method, notably the extraction of the right of access from the licence $L_p$, thus preventing the access to the segments, and returns to the step 1400 to process the next segment $S_{i+1}$.

In the step 1416, if the intermediate key $K_{Gp}$ contained in the right of access 52 has not already been extracted therefrom since the start of the playing phase, then the terminal 4 extracts, from the licence $L_p$ found in the step 1412, the cryptogram $(K_{gp})*K_T$.

Then, in the step 1418, the terminal 4 decrypts the cryptogram $(K_{Gp})*K_T$ with its terminal key $K_T$, thus obtaining the intermediate key $K_{Gp}$.

Then, in the step 1420, the terminal 4 decrypts the cryptogram $(K_{si})*K_{Gp}$ with the intermediate key $K_{Gp}$ decrypted in the step 1418, thus obtaining the specific key $K_{si}$.

Finally, in the step 1422, the terminal 4 decrypts the cryptogram of the segment $S_i$ with the specific key $K_{si}$ obtained in the step 1420, so as to obtain the segment $S_i$ in free-to-air form. The segment $S_i$ in free-to-air form can then be transmitted by the terminal 4 to any multimedia appliance to be played. The method then returns to the step 1400 to receive and play the next segment $S_{i+1}$.

Numerous other embodiments of the invention are possible. For example, the content is supplied, by the system for supplying protected multimedia content, encrypted with a plurality of keys as part of its protection by the digital rights management system. A plurality of licences, each containing at least one of these content keys, are then necessary for the terminal to access the content. The method claimed is then applied to at least one of these licences.

In another embodiment, the right of access 52 of the licence $L_p$ comprises the intermediate key $K_{Gp}$ and not the cryptogram $(K_{Gp})*K_T$. In this embodiment, the terminal licence is not necessary.

In the preceding embodiment, the right of access is a cryptogram of the key $K_{Gp}$ obtained by encrypting it with the cryptographic key $K_T$. A cryptogram is an item of information that is insufficient in itself to retrieve the content key $K_{si}$. Thus, if the transmission of the licence is intercepted, the content key that makes it possible to descramble a segment of the multimedia content cannot be retrieved if only the cryptogram is known. To retrieve the content key uncoded, that is to say the content key that makes it possible to directly descramble the segment of the multimedia content, the cryptogram must be combined with a secret information item. In the preceding example, the secret information item is the cryptographic key $K_T$ that make it possible to decrypt the cryptogram $(K_{Gp})^*K_T$. Other ways of obtaining the cryptogram contained in the right of access are possible. For example, the cryptogram can be a pointer to a cryptographic key stored uncoded in a table containing a multitude of possible intermediate keys. In this case, the secret information item is the table associating, an uncoded cryptographic key with each pointer. The cryptogram can also be:
- an identifier of this cryptographic key, to be supplied to the headend, via a return channel, thus making it possible to request the key from the headend, then to receive, in response and typically only after a successful authentication of the terminal, the cryptographic key or an initialization value that enables the terminal to reconstruct this cryptographic key;
- a link, typically a URL (Uniform Resource Locator), that makes it possible to go and read, typically only in the case of a successful authentication of the terminal, this cryptographic key on a cryptographic key server; or
- an initialization value, enabling the terminal to reconstruct this cryptographic key, typically by performing a computation of the value of this key by using, for example, a secret algorithm known only to the terminal and to the headend.

Alternatively, the content is supplied protected by a digital rights management system but without being encrypted. The content key is not then included in the access data inserted into the licence.

In another embodiment, the multimedia content is supplied protected by a conditional access system, or CAS. The terminology of the field of conditional access systems is then used. The interested reader will be able, for example, to find a more comprehensive presentation thereof in the document: "Functional Model of a Conditional Access System", EBU Review, Technical European Broadcasting Union, Brussels, BE, N° 266, 21 Dec. 1995. A segment is then a cryptoperiod, a terminal licence is an EMM, and the intermediate licence is an ECM. The date of transmission is then typically inserted into an ECM.

In another embodiment, the content is supplied, by the system, protected by any other type of content protection system, such as, for example, a more conventional data protection system that does not perform any access rights management. The method claimed is then applied to the supply of the messages necessary for the routing of the decryption keys, for example.

In another embodiment, all the segments of a block of content segments do not immediately follow one another in the temporal unfolding of the content. Some of these segments are then separated therein by segments not belonging to the block concerned.

As a variant, a terminal shares, with at least one other, its so-called terminal encryption and decryption keys.

As a variant, the network 3 comprises a first one-way information transmission subnetwork between the head 1 and the terminal 4 and a second two-way information transmission subnetwork between the server 2 and the terminal 4. For example, the first subnetwork is a satellite transmission network and the second subnetwork is the Internet network.

As a variant, the clock 12 of the head 1 is synchronized with a reference dock according to a protocol distinct from NTP. In another variant, the clock 12 is synchronized with the date server 2. In another variant, the clock 12 is synchronized with a reference clock internal to the head 1. In a final variant, the clock 12 is itself a reference clock internal to the head 1. Similarly, the date server 2 can be synchronized with a reference clock according to a protocol distinct from NTP. In another variant, the server 2 itself comprises a reference clock with which it is synchronized. It is also possible for the dock 12 and the date server 2 to be synchronized with reference docks according to different protocols.

As a variant, the date server 2 is incorporated in the headend 1.

The number of blocks and segments per block can vary. For example, the stream 6 comprises a single block of content segments. In another variant, each block comprises a single segment. In another embodiment, the number of segments in each block is not necessarily the same from one block to another.

The date $TS_i$ of transmission of the segment 622 can be inserted into a message or a data structure other than the intermediate licence associated with this segment. However, this message or this other data structure is transmitted together with the segment and with the intermediate licence. For example, the date of transmission is adjacent to each segment transmitted in the stream but does not form part of the data structure forming the licence $L_i$.

Other embodiments of the licence $L_p$ are possible. For example, the head 1 can, in the step 1200, to complement the right of access 52 of the licence $L_p$, combine additional rules or access criteria with the cryptogram $(K_{Gp})^*K_T$. In the step 1416, these additional rules or criteria are then also extracted from the right of access 52 by the terminal 4, then evaluated. The success of this evaluation then conditions the implementation of the step 1418 of decrypting the cryptogram $(K_{Gp})^*K_T$.

As a variant, the headend 1 obtains the date of transmission of a segment from the date server 2, or from a third-party date server external to the system of FIG. 1.

As a variant, the service for supplying contents concerned is a service for broadcasting or downloading contents for which the recording is not controlled by the content protection system, and the purpose of the request received in the step 1100 is to obtain the content to record it in order to play it subsequently. The steps 1284 and 1206 are not then subject to any synchronization constraint, so that, depending on the dynamics of the service, they can be simultaneous or follow one another in either order. The same then applies to the steps 1300 and 1302.

In another variant, the predetermined duration TSW is not used. This amounts to taking this duration TSW to be equal to 0 in the step 1404 of the method of FIG. 5. Similarly, it is not necessary to use the predetermined duration ETTD. This therefore amounts to considering that, in the step 1404 of FIG. 5, the duration ETTD is infinite. In this case, the updating of the date $TT_s$ is initiated otherwise. For example, this updating is initiated periodically or after having received a predetermined number of segments $S_i$ to be decrypted.

As a variant, in the step 1408, if the value of the connection failure counter crosses the threshold Max_tts_bypass, the terminal 4 disables the step 1410 and subsequent steps of the method, notably the extraction of the right of access from the terminal licence $L_p$, and, for example, terminates the phase of playing the protected multimedia content.

As a variant, the terminal 4 does not include any counter of failures to connect to the date server 2. Thus, in the step 1408, from the very first time that the connection to this server could not be established, the terminal disables the extraction of the right of access from the licence thus preventing the access to the segments.

In the step 1414, if the last acquired service date TE does not satisfy the temporal criterion 54 of the licence $L_p$ found in the step 1412, the terminal can search for or try to use another licence comprising the identifier $Id(K_{Gp})$ 50 of the intermediate key $K_{Gp}$. In another variant, it disables the step 1416 and subsequent steps of the method, notably the extraction of the right of access from the terminal licence $L_p$, and, for example, terminates the phase of playing the protected multimedia content.

The invention claimed is:

1. A process for participating in the distribution of multimedia content protected by a multimedia-content protection system, said process comprising, at a terminal, in response to execution of a transmission phase by a headend, executing a reception phase and a playing phase,
   wherein the transmission phase comprises, at said headend,
   a) requiring a necessary right of access and a license to enable a terminal to access any segment of a block of multimedia content in order to play the block, wherein the license includes the right of access and a temporal validity criterion, wherein each of the segments in the block of multimedia content includes at least one series of groups of video images or of audio frames, wherein the block comprises one or more segments, and
   b) transmitting, to the terminal, the license and a stream comprising each segment together with that segment's transmission date,
   wherein the reception phase comprises, at the terminal
   c) receiving the stream of multimedia content segments, and
   d) receiving the license,
   wherein the playing phase comprises
   e) authenticating a date server and, only if the date server is successfully authenticated, acquiring a service date from the date server, and
   f) evaluating the time criterion of the license with respect to the last acquired service date, then, if the result of the evaluation is positive, extracting the right of access from the license, thus allowing access to the segments and, otherwise, disabling the extraction of the right of access from the license, thus preventing access to the segments,
   g) extracting, from the stream, together with a segment, the segment's transmission date and comparing the extracted transmission date with the last acquired service date, and only if the extracted transmission date is later than the last acquired service date, acquiring it as service date, and using it as the last acquired service date in a next execution of step f) that occurs between two successive executions of step e), and
   playing the segments.

2. The process of claim 1,
   wherein step c) further comprises receiving a stream comprising each segment of the block of multimedia content segments,
   wherein step d) further comprises receiving a license that includes a right of access necessary for the terminal to access any segment of the block in order to play the block and a temporal validity criterion,
   wherein, step e) further comprises authenticating a date server and, only after having successfully authenticated the date server, acquiring a service date from the date server,
   wherein step f) further comprises evaluating the temporal validity criterion with respect to the last acquired service date, then, if the result of the evaluation is positive, extracting the right of access from the license, thus allowing access to the segments and, otherwise, disabling the extraction the right of access from the license, thus preventing the access to the segments,
   wherein step g) further comprises extracting, from the stream, together with a segment, the segment's transmission date, comparing the extracted transmission date with the last acquired service date, and only if the extracted transmission date is later than this last acquired service date, to acquiring it as a service date and using it as last acquired service date in a next execution of step f) that occurs between two successive executions of step e).

3. The process of claim 2, wherein the right of access comprises an intermediate key or a cryptogram of the intermediate key obtained by encrypting the intermediate key with a cryptographic key of the terminal, the intermediate key being a key used to encrypt the keys of all the segments of the block of segments, each key being the key used to encrypt a respective segment of the multimedia content.

4. The process of claim 2, wherein step g) further comprises comparing the extracted transmission date with the last acquired service date, and, only if the extracted transmission date is prior to this last service date by no more than a first predetermined duration, leaving the last acquired service date unchanged, as a result of which step f) is executed by using the last acquired service date, which has been left unchanged.

5. The process of claim 2, wherein step g) comprises comparing the extracted transmission date to the service date acquired on the last execution of step e) and re-executing step e) if the difference between the extracted transmission date and this service date is longer than a second predetermined duration and, otherwise, refraining from re-executing step e) in response to the comparison.

6. The process of claim 2, wherein step e) comprises determining that the connection to the date server cannot be established and in response, disabling the extraction of the right of access from the license, thus preventing access to the segments.

7. The process of claim 6, further comprising, at the terminal, counting the number of consecutive times in which the connection to the date server cannot be established and, in response to the number having crossed a predetermined threshold, disabling extraction of the right of access from the license, thus preventing the access to the segments and, otherwise, allowing extraction of the right of access from the license, thus allowing access to the segments.

8. The process of claim 2, further comprising, between two consecutive executions of step f), extracting one or more received segment transmission dates and, each time a transmission date is extracted that is later than the last acquired service date, acquiring that transmission date as the service date to be used as a last acquired service date on the next execution of step f).

9. A manufacture comprising a tangible and non-transitory information storage medium having encoded thereon instructions that, when executed by a terminal, cause said terminal to participate in distribution of multimedia content protected by a multimedia-content protection system, wherein said instructions comprise instructions for executing a reception phase and a playing phase in response to execution of a transmission phase by a headend, wherein said transmission phase comprises, at said headend,
 a) requiring a necessary right of access and a license to enable a terminal to access any segment of a block of one or more segments of multimedia content in order to play said block, wherein said license includes a right of access and a temporal validity criterion, wherein each of said segments includes at least one series of groups of video images or groups of audio frames, wherein said block comprises one or more segments, and
 b) transmitting, to said terminal, said license and a stream comprising each segment together with that segment's transmission date,
wherein said reception phase comprises, at said terminal
 c) receiving said stream of multimedia content segments, and d) receiving said license,
wherein said playing phase comprises
 e) authenticating a date server and, only if said date server is successfully authenticated, acquiring a service date from said date server, and
 f) evaluating said time criterion of the license with respect to a last acquired service date, then, if the result of said evaluation is positive, extracting said right of access from the license, thus allowing access to said one or more segments and, otherwise, disabling said extraction of said right of access from said license, thus preventing access to said one or more segments,
 g) extracting, from said stream, together with a segment, said segment's transmission date, comparing said extracted transmission date with said last acquired service date, and only if said extracted transmission date is later than said last acquired service date, acquiring said extracted transmission date as said service date, and using said service date as the last acquired service date in a next execution of step f) that occurs between two successive executions of step e), and
 playing said segments at said terminal.

10. An apparatus comprising a terminal comprising a processor and a memory, wherein said memory stores instructions that, when executed by said processor, cause said processor to participate in distribution of multimedia content protected by a multimedia-content protection system, wherein said instructions comprise instructions for executing a reception phase and a playing phase in response to execution of a transmission phase by a headend, wherein said transmission phase comprises, at said headend,
 a) requiring a necessary right of access and a license to enable a terminal to access any segment of a block of one or more segments of multimedia content in order to play said block, wherein said license includes a right of access and a temporal validity criterion, wherein each of said segments includes at least one series of groups of video images or groups of audio frames, wherein said block comprises one or more segments, and
 b) transmitting, to said terminal, said license and a stream comprising each segment together with that segment's transmission date,
wherein said reception phase comprises, at said terminal
 c) receiving said stream of multimedia content segments, and d) receiving said license,
wherein said playing phase comprises
 e) authenticating a date server and, only if said date server is successfully authenticated, acquiring a service date from said date server, and
 f) evaluating said time criterion of the license with respect to a last acquired service date, then, if the result of said evaluation is positive, extracting said right of access from the license, thus allowing access to said one or more segments and, otherwise, disabling said extraction of said right of access from said license, thus preventing access to said one or more segments,
 g) extracting, from said stream, together with a segment, said segment's transmission date, comparing said extracted transmission date with said last acquired service date, and only if said extracted transmission date is later than said last acquired service date, acquiring said extracted transmission date as said service date, and using said service date as the last acquired service date in a next execution of step f) that occurs between two successive executions of step e), and
 playing said segments at said terminal.

11. A process for participating in the distribution of multimedia content protected by a multimedia content protection system, said process comprising executing a transmission phase, causing execution of a reception phase, and causing execution of a playing phase, wherein the transmission phase, comprises, at the headend,
 a) requiring a license and a necessary right of access to access any segment of a block of multimedia content segments, wherein the necessary right of access enables a terminal to access any segment of the block in order to play the block, wherein the license includes the right of access and a temporal validity criterion, wherein each of the segments includes at least one series of groups of video images or of audio frames, wherein the block comprises one or more segments, and
 b) transmitting, to the terminal, the license and a stream that comprises each segment and that segment's transmission date,
wherein the reception phase comprises, at the terminal,
 c) receiving the stream of multimedia content segments, and
 d) receiving the license,
wherein the playing phase comprises, at the terminal, in addition to playing the segments,
 e) authenticating a date server and, only if the date server is successfully authenticated, acquiring a service date from the date server,
 f) evaluating the time criterion of the license with respect to the last acquired service date, then, if the result of the evaluation is positive, extracting the right of access from the license, thus allowing access to the segments and, otherwise, disabling the extraction of the right of access from the license, thus preventing access to the segments, g) extracting, from the stream, together with a segment, the segment's transmission date, comparing the extracted transmission date with the last acquired service date, and, only if the extracted transmission date is later than the last acquired service date, acquiring it as the service date and to using it as last acquired service date in a next execution of step f) that occurs between two successive executions of step e).

\* \* \* \* \*